United States Patent Office 3,530,093
Patented Sept. 22, 1970

3,530,093
COMPOSITIONS COMPRISING AN EPOXY RESIN, DICYANDIAMIDE AND AN AMINOPYRIDINE
Juerg Maurer, Riehen, Switzerland, assignor to Ciba Limited, Basel, Switzerland, a company of Switzerland
No Drawing. Filed Nov. 19, 1968, Ser. No. 777,183
Claims priority, application Switzerland, Dec. 8, 1967, 17,249/67
Int. Cl. C08g 30/14
U.S. Cl. 260—47    9 Claims

ABSTRACT OF THE DISCLOSURE

Storable mixtures which cure rapidly at an elevated temperature and are suitable for the manufacture of shaped structures, impregnations, coatings and adhesive bonds, especially when used in form of sinter powders, characterized in that they contain:

(a) A polyepoxy compound whose molecule contains on an average more than one epoxide group,
(b) Dicyandiamide as curing agent, and
(c) As curing accelerator a monoaminopyridine of the formula

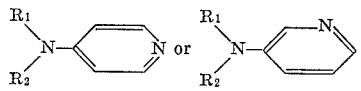

in which, independently of each other, $R_1$ and $R_2$ represent a hydrogen atom or an aliphtaic, cycloaliphatic, araliphatic or aromatic residue each. or $R_1+R_2$ represent a divalent aliphatic, cycloalphatic or araliphatic residue.

---

It is known that epoxy resins can be cured with dicyandiamide at an elevated temperature to form insoluble, cross-linked, high-molecular products. The cured products are distinguished by good general chemical and mechanical properties, espeically by their outstanding adhesion to metals and many materials. There should also be stressed the good storability of the thermocurable mixtures of epoxy resins with dicyandiamide which, therefore, are very suitable for so-called "one-component systems" such as sinter powders, moulding compositions or for "prepregs."

For many applications as thermocurable coating and moulding materials, however, the epoxy resin systems cured with dicyandiamide alone have undesirably long curing times at relatively high curing temperatures, and rational curing conditions desirable in this connection, for example a curing cycle of 30 mintues at 150° C., cannot be realized at all.

The curing operation must be carried out at a higher temperature, for example for 45 to 50 minutes at 180° C., which—for example with white powder lacquers—leads to undesirable yellowing.

The conventional accelerating additives, such for instance as tertiary amines, which in curing epoxy resins with polycarboxylic acid anhydrides substantially accelerate the gelling and curing, produce with dicyandiamide only a minor acceleration. While it is possible to shorten the curing time by adding a larger amount of accelerator, the storability of such combinations is lost materially or even completely. In most cases dicyandiamide is used as curing agent for epoxy resins just because it means good storing properties.

To overcome these disadvantages French specification No. 1,485,389 proposed to use as accelerator for curing epoxy resins with dicyandiamide alcoholates of alkali or alkaline earth metals, preferably those alcoholates which are derived from alkanolamines, such as triethanolamine. While these accelerators constitute an advance over the other known accelerators, it is still necessary to use a relatively considerable amount thereof to achieve an effective acceleration, namely about 2 to 5 parts by weight for every 100 parts by weight of epoxy resin. Such relatively large quantities, however, impair the storability and the mechanical and chemical properties of the cured products.

It has now surprisingly been found that certain monoaminopyridines substituted in position 3 or 4 have a substantially higher activity as accelerators, and that even when only a tenth of the amount is used, than the alcoholates described in French specification 1,485,389. Such low, effective amounts have, in surprising contradistinction to the alcoholates known as accelerators, no adverse influence on the storability and the properties of the cured products.

Accordingly the present invention provides storable mixtures, which cure rapidly at elevated temperature and are suitable for the manufacture of shaped structures, impregnations, coatings and adhesive bonds, especially when used in form of sinter powders, characterized in that they contain (a) a polyepoxy compound whose molecule contains on an average more than one epoxide group, (b) dicyandiamide as curing agent and (c) as curing accelerator a monoaminopyridine of the formula

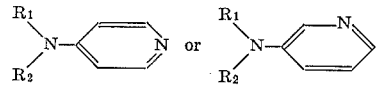

in which, independently of each other, $R_1$ and $R_2$ represent a hydrogen atom or an aliphatic, cycloaliphatic, araliphatic or aromatic residue each, or $R_1+R_2$ represent a divalent aliphatic or araliphatic residue.

The curing accelerators used according to this invention are thus pyridines monosubstituted by $NH_2$ or $NR_2$ in position 3 or 4 (R=hydrogen, aryl or the like). The highest activity is found in 4-aminopyridine of which even a very low concentration (0.2 part for every 100 parts of epoxy resin) is a highly efficient accelerator for dicyandiamide curing.

Apart from 4-aminopyridine, for example the following analogous pyridine derivative produce an acceleration of dicyandiamide curing: 4-anilinopyridine and 3-aminopyridine, but not 2-aminopyridine.

Further suitable monoaminopyridines are 4-methylaminopyridine, 3 - methylaminopyridine, 4 - dimethylaminopyridine, 3-dimethylaminopyridine, 4-ethylaminopyridine, 4-butylaminopyridine, 4-toluidinopyridine, 4-cyclohexylaminopyridine, 4 - piperidinopyridine and 4-morpholinopyridine.

The following Table I shows the accelerating effect of the different monoaminopyridine listed, in each case equal amounts of epoxy resin, dicyandiamide and accelerator being used. The epoxy resin A was a diomethane polyglycidyl ether obtained by reacting epichlorohydrin with 2,2-bis(p-hydroxyphenyl)propane in the presence of alkali, having the following characteristics: Melting point (Durran): 65–75° C.; containing 1.8–2.4 epoxide equivalents per kg.; specific gravity: 1.19.

TABLE 1

| 100 g. of epoxy resin | 6 g. of curing agent | 0.2 g. of accelerator | Gelling time at 180 ±2° C. in seconds |
|---|---|---|---|
| A | Dicyandiamide | | 900 |
| A | do | 4-aminopyridine | 221 |
| A | do | 4-anilinopyridine | 447 |
| A | do | 3-aminopyridine | 402 |
| A | do | 2-aminopyridine | 1,103 |

The manufacture of the aminopyridines, together with a literature review, has been described in the cumulative volume "Pyridine and its Derivatives," part 3 (Interscience Publishers, New York 1962).

The accelerator should be distributed in the epoxy resin system as homogeneously as possible, that is to say the accelerator is advantageously used in a microdispersed or dissolved state.

The effect of the accelerator materializes even when it is used in a very low concentration. In general 0.05 to 0.5 part by weight for every 100 parts of epoxy resin suffice; preferably, about 0.2 part by weight for every 100 parts by weight of resin is used.

As polyepoxy compounds whose molecule contains on an average more than one epoxide group, to be used in the curable mixtures of this invention, there may be specially mentioned: Alicyclic polyepoxides such as epoxyethyl-3, 4-epoxycyclohexane(vinylcyclohexene diepoxide), limonene diepoxide, dicyclopentadiene diepoxide, bis(3,4-epoxycyclohexylmethyl) adipate, (3',4'-epoxycyclohexylmethyl)-3,4-epoxycyclohexane carboxylate (3',4'-epoxy-6'-methyl-cyclohexylmethyl)-3,4-epoxy-6-methyl - cyclohexane carboxylate, 3 - (3',4-epoxycyclohexyl)-2,4-dioxaspiro(5.5)-8,9-epoxyundecane, 3 - (glycidyloxyethoxyethyl)-2,4-dioxaspiro(5.5)-8,9-epoxyundecane, 3,9-bis(3',4'-epoxycyclohexyl)-spirobi(meta-dioxane); di- or polyglycidyl ethers of polyhydric alcohols such as 1,4-butanediol or of polyglycols such as polypropyleneglycols; di- or polyglycidyl ethers of polyhydric phenols such as resorcinol, bis(p-hydroxyphenyl)methane, 2,2 - bis(p-hydroxyphenyl)propane (=diomethane), 2,2-bis(4'-hydroxy-3',5'-dibromophenyl)propane, 1,1,2,2, - tetrakis(p-hydroxyphenyl)ethane, or of condensation products of phenols with formaldehyde obtained under acid conditions such as phenol-novolaks and cresol-novolaks; furthermore di- and poly($\beta$-methylglycidyl) ether of the polyalcohols and polyphenols mentioned above; polyglycidyl esters of polybasic carboxylic acids such as phthalic, terephthalic, tetrahydrophthalic and hexahydrophthalic acid; N-glycidyl derivatives of amines, amides and heterocyclic nitrogen bases such as N,N-diglycidylaniline, N,N-diglycidyltoluidine, N,N,N',N' - tetraglycidyl-bis(p-aminophenyl)methane; triglycidylisocyanurate; N,N'-diglycidyl-5,5-dimethylhydantoin.

The new mixtures of resin, curing agent and accelerator are advantageously cured at 150 to 200° C. within $\leq$ 30 minutes.

In the preferred use of the curable mixtures of this invention in form of sinter powders it is possible to achieve, for example, with 4-aminopyridine as accelerator, a curing cycle of 30 minutes at 150° C., whereas with an otherwise identically composed sinter powder containing a known accelerator a curing cycle of 45 to 50 minutes at 180° C. was required.

The term "curing" as used in this context means the conversion of the soluble, liquid or fusible polyepoxides into solid, insoluble and infusible, three dimensionally crosslinked products or materials, as a rule with simultaneous shaping to yield shaped structures such as castings, mouldings, laminates or the like, or "flat, two dimensional structures" such as coatings, lacquer films or adhesive bonds.

If desired, the curing may be performed in two stages, by terminating the curing reaction prematurely, whereby a still fusible and soluble, curable precondensate (the so-called "B-stage") consisting of the epoxy component (a) and the dicyandiamide curing agent (b) is obtained. Such a precondensate is more or less restrictedly storable and can be used, for example, for the manufacture of "prepregs," moulding compositions and especially sinter powders.

The curable mixtures of this invention may further contain suitable plasticizers such as dibutylphthalate, dioctylphthalate or tricresyl phosphate, inert organic solvents or so-called active diluents, especially monoepoxides, for example styrene oxide, butylglycide or cresylglycide.

Furthermore, the curable mixtures of this invention may be admixed at any stage prior to the curing operation with extenders, fillers and reinforcing agents, for example coal tar, bitumen, textile fibres, glass fibres, asbestos fibres, boron fibres, carbon fibres, mineral silicates, mica, quartz meal, titanium dioxide, alumina hydroxide, bentones, kaolin, silica-aerogel or metal powders such as aluminium powder, furthermore with pigments and dyestuffs such as lampblack, oxide dystuffs, titanium dioxide or the like. The curable mixtures may further contain other conventional additives, for example flame-proofing agents such as antimony trioxide, thixotropizing agents, flow control agents such as silicones, cellulose acetobutyrate, polyvinylbutyral, waxes, stearates etc. (some of which are also used as mould release agents).

The curable mixtures of this invention may be manufactured in the usual manner with the use of known mixers (stirrers, kneaders, roller mills etc.).

The epoxy resin mixtures of this invention are primarily used for surface protection, in the electrical industry, in laminating processes and in building work. They may be used in a formulation adapted to the individual use, in the unfilled or filled state, if desired in form of solutions or emulsions, as paints, lacquers, moulding compositions, dipping resins, casting resins, injection moulding compositions, impregnating resins, adhesives and binders, as tool resins, laminating resins, sealing and grouting compositions, flooring compositions and binders for mineral aggregates.

The new products are mainly used as moulding powders and especially as sinter powders. The epoxy resin powder mixtures may be worked up with or without application of superatmospheric pressure by known processes, such as the fluidized bed method, the electrostatic fluidized bed method, spraying, electrostatic spraying, pressing etc.

Unless otherwise indicated, parts and percentages in the following examples are by weight. The relationship between parts by volume and parts by weight is the same as that between millilitre and gram.

For the manufacture of the curable epoxide resin mixtures described in the examples the following epoxy resins were used:

EPOXY RESIN A

Solid diomethane polyglycidyl ether, prepared by condensing epichlorohydrin with diomethane (=2,2-bis [p-hydroxyphenyl]propane) in the presence of alkali, having the following characteristics:

Content of epoxide equivalents—1.8–2.4 per kg.
Melting point (Durran)—65–75° C.
Specific gravity—1.19
Content of hydrolyzable chlorine—0.018%

Such an epoxy resin may be prepared, for example, thus:

2750 parts of 2,2-bis(p-glycidyloxyphenyl)-propane [5.36 epoxide equivalents/kg.], which has been obtained by reacting 1 mol of 2,2-bis(p-hydroxyphenyl)propane with 4–6 mols of epichlorohydrin and subsequent treatment with 2 mols of alkali, are mixed with 812 parts of 2,2-bis(p-hydroxyphenyl)propane and 0.2 parts of tetramethyl ammonium chloride and heated for 3 to 6 hours at 160–170° C., to yield 3559 parts of a resin, which is solid at room temperature and contains 2.08 epoxide equivalents per kg. and 0.018% of hydrolyzable chlorine.

EPOXY RESIN B

Solid diomethane polyglycidyl ether, obtained by condensing epichlorohydrin with diomethane in the presence of alkali, having the following characteristics:

Content of epoxide equivalents—0.975–1.210/kg.
Melting point (Durran)—95–105° C.
Specific gravity—1.19
Content of hydrolyzable chlorine—0.029%

As described for the manufacture of epoxy resin A an epoxy resin, containing 1.07 epoxide equivalents per kg., is prepared from 1700 parts of 2,2-bis(p-glycidyloxyphenyl)propane, 722 parts of 2,2-bis(p-hydroxyphenyl)propane and 0.14 part of tetraethyl ammonium bromide.

EPOXY RESIN C

Ortho-cresol-novolak polyglycidyl ether, prepared by condensing epichlorohydrin with an o-cresol-novolak (molecular ratio o-cresol:formaldehyde=about 1:1.1; catalyst: oxalic acid) in the presence of alkali, having the following characteristics:

Content of epoxide equivalents—4.4 per kg.
Melting point—about 73° C.
Content of hydrolyzable chlorine—0.234%

EPOXY RESIN D

As described for the manufacture of epoxy resin A, 1500 parts of 2,2-bis(p-glycidylphenyl)propane [5.23 epoxide equivalents/kg.], 555 parts of 2,2-bis(p-hydroxyphenyl)propane and 0.15 part of tetramethyl ammonium chloride were heated for 3–6 hours at 160 to 170° C., to yield 2048 parts of a resin, which is solid at room temperature and contains 1.40 epoxide equivalents per kg. and 0.15% of hydrolyzable chlorine.

MEASURING THE GELLING TIME

In the following examples the gelling time was measured by an internal testing method, in which:

An electric heating plate (diameter 115 mm.; makers Messrs. Electro-Physik, Cologne) was adjusted to the test temperature. The temperature was measured with a laterally inserted sensor of a thermoelement (seconds-thermometer, makers Quarz A.G., Zurich). The temperature was kept constant within a range of ±2° C.

About 0.5 g. of test material was placed upon the heater plate and at the same time a stopwatch was started, and the molten material was then moved evenly to and fro with a spatula. As curing progressed, the viscosity began to increase apace. The spatula was periodically raised and the formation of a filament observed. The point of time at which the filament formation suddenly collapses and the material gels to form a coherent layer is the end point of the test and is stopped by the stopwatch. The gelling time measured in this manner is indicated in seconds.

EXAMPLE 1

Different mixtures of epoxy resin+dicyandiamide+curing agent (test specimens 1 to 4) were prepared by melting and mixing at 120° C. in 50-g. lots in beakers, once without and once with addition of 0.2% by weight of 4-aminopyridine referred to epoxy resin. By carefully triturating the cooled mixtures in a mortar the insoluble substances dicyandiamide and 4-aminopyridine were distributed as finely as possible in the epoxy resin.

As is revealed by the following Table II the gelling times of the mixtures are substantially shortened by the small addition of 4-aminopyridine.

TABLE II

| | Test specimen | | | |
|---|---|---|---|---|
| | 1 | 2 | 3 | 4 |
| Epoxy resin A, grams | 50 | 50 | | |
| Epoxy resin C, grams | | | 50 | 50 |
| Dicyandiamide, grams | 3 | 3 | 3 | 3 |
| 4-aminopyridine, grams | | 0.1 | | 0.1 |
| Gelling time in seconds at 180±2° C | 900 | 221 | 512 | 177 |

EXAMPLE 2

An epoxy resin sinter powder mixture was prepared from

| | Parts |
|---|---|
| Epoxy resin A | 512.7 |
| Epoxy resin B | 1196.7 |
| Titanium dioxide (rutile) | 501.6 |
| Barium sulphate | 501.6 |
| Polyvinylbutyral [flow control agent] (registered tradename) Butvar D-510 | 113.1 |
| Polyethylene powder | 8.4 |
| Dicyandiamide | 153.3 |
| 4-aminopyridine | 3.6 |

FORMULATION (a) Resin+filler+flow control agent mixture (I)

The epoxy resins were heated in a suitable mixing vessel at a temperature rising to 170° C. and thereby melted. Then the flow control agent, polyethylene, titanium dioxide and barium sulphate were stirred into the melt which was stirred on mechanically without supply of heat, during which the temperature of the mixture dropped to 120° C. After a total stirring time of 20 minutes the mixture was poured over a plate covered with a cellophane foil. The solidified material was powdered in a beater mill (sieve: 3 mm. mesh).

(b) Curing agent+accelerator mixture (II)

Independently of the mixture (I) the following mixture (II) was prepared:

The curing agent dicyandiamide and 4-aminopyridine, in the correct weight proportions, were charged into a 4.5-litre ball mill and mixed and ground in it for 24 hours.

(c) Manufacturing the finished sinter powder

The correct proportions by weight of the mixture (I) and (II) in the dry state were first thoroughly mixed (for example in a ball mill without balls) and then continuously homogenized in a Ko-kneader of Messrs. Buss A.G., model PR 46, at a temperature of 80–90° C. for a contact time of 4 minutes. The cooled, solidified mixture was ground first coarsely (beater mill with 3 mm. sieve) and then finely (rod mill, 1200 r.pm.). After sieving to a particle size of $\leq 60\mu$ an epoxy resin powder was obtained which is very suitable for electrostatic spraying and has the following properties:

(1) Properties of the powder:

Sintering point Kofler heater)—75° C.
Melting point (Kofler heater)—95° C.
Gelling time at 180° C.—53 seconds
Gelling time at 150° C.—238 seconds
Flow, assessed visually after 14 days' storage at 38° C.—unchanged; good (2) Properties of the cured coating (applied by means of an electrostatic spray installation of Messrs. Sames to cleaned, cold sheet iron); stoving temperature: 150° C; stoving time: 30 mnutes; film thickness: 65μ):

Deep drawing value according to Erichsen (DIN 53 156)—7.2 mm.
Gloss (photovoltmeter)—64

For comparison an epoxy resin sinter powder of identical composition but without addition of 4-aminopyridine as accelerator was prepared. It revealed the following properties:

(1) Properties of the powder:

Sintering point (Kofler heater)—70° C.
Melting point (Kofler heater)—91° C.
Gelling time at 180° C.—280 seconds
Gelling time at 150° C.—1500 seconds
Flow, visually assessed after 14 days' storage at 380° C.—unchanged; good (2) Properties of the cured coating (applied by means of an electrostatic spray installation of Messrs. Sames to cleaned, cold sheet iron; stoving temperature: 150° C; stoving time: 30 minutes; film thickness: 110μ):

Deep drawing value according to Erichsen (DIN 53 156)—0.7 mm.
Gloss (photovoltmeter)—67

Under optimal stoving conditions (50 minutes at 180° C.) the deep drawing value according to Erichsen was found to be 5.9 mm. (film thickness: 110μ).

EXAMPLE 3

In this example a curable epoxy resin+dicyandiamide mixture with 4-aminopyridine as accelerator according to this invention is compared with an otherwise identically composed, known epoxy resin mixture which, however, contains as accelerator instead of 4-aminopyridine an equal quantity of one of the alcoholates proposed as accelerators for dicyandiamide curing in French specification 1,485,389 ("Alcoholate V," p. 3, righthand column).

The alcoholate is manufactured as follows:

149 grams (1 mol) of triethanolamine are heated to about 80° C. under nitrogen. Then 40 g. of 50% aqueous sodium hydroxide solution (0.5 mol) are run in, with the mixture heating up further exothermally. The introduction of nitrogen is discontinued when all sodium hydroxide solution has been run in. The internal temperature is about 95° C. The pressure is reduced and water distilled off at a temperature rising to about 160° C. under about 20 mm. Hg pressure. The initially clear mixture turns strongly turbid during the distrillative removal of water; on cooling to room temperature it solidifies and forms a colourless crystalline substance meling between about 85 and 110° C.

From the mixture, which originally contained 1.1 mols of water (in the 50% aqueous sodium hydroxide solution) for every mol of triethanolamine used, 30.5 g. (1.7 mols) of water are distilled off in the course of the reaction. By potentiometric titration it can be shown that hte product (= "Alcoholate V") contains about 3 sodium equivalents per kg. and about 6 nitrogen equivalents per kg.

The following Table III shows the compositions of the known and of the new curable mixtures as well as the gelling times of the two mixtures.

TABLE III

| | Mixture according to— | |
|---|---|---|
| | This invention | French specification 1,485,389 |
| Epoxy resin A, grams | 15.62 | 15.62 |
| Epoxy resin B, grams | 21.15 | 21.15 |
| Dicyandiamide, grams | 2.12 | 2.12 |
| 4-aminopyridine, grams | 0.077 | |
| "Alcholate V," grams | | 0.077 |
| Gelling time, seconds, at 180±2° C | 271 | 527 |

EXAMPLE 4

The accelerating effect of 4-aminopyridine in epoxy resin curing according to this invention may be utilized to shorten the setting time of binders based on epoxy resin+dicyandiamide:

| | Parts | |
|---|---|---|
| Composition | Binder A | Binder B |
| Epoxy resin D | 100 | 100 |
| Dicyandiamide | 3.7 | 3.7 |
| 4-aminopyridine | | 0.125 |

The ingredients are combined and finely powdered so that an intimate mixture results.

The binder B containing the accelerator has a much shorter gelling time than binder A:

| | Binder A | Binder B |
|---|---|---|
| Gelling time, seconds, at 200° C | 360 | 210 |
| Gelling time, seconds, at 180° C | 1,000 | 480 |

To determine the tensile shear strength sheets of aluminium marketed under the registered trade name "Anticorodal B" (170 x 25 x 1.5 mm.; 10 mm. overlap) are heated to 150° C., sprinkled with the binder, clamped and hardened in an air stove. The tensile shear strength values of the cemented specimens are measured at room temperature

| Tensile shear strength (kilopounds/sq. mm.) | Binder A | Binder B |
|---|---|---|
| After 20 minutes' hardening at 180° C | 0.4–0.6 | 2.3–2.5 |
| After 60 minutes' hardening at 180° C | 3.7–3.9 | 3.7–3.9 |

I claim:
1. A curable composition of matter consisting essentially of
   (a) a polyepoxide whose molecular contains on an average more than one 1,2-epoxide group,
   (b) dicyandiamide as curing agent, and
   (c) as curing accelerator a monoaminopyridine of the formula

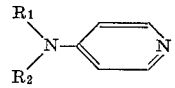

or of the formula

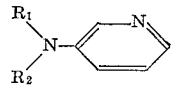

in which two formulae $R_1$ and $R_2$ each represent a member selected from the group consisting of hydrogen atom, aliphatic, cycloaliphatic, araliphatic and aromatic hydrocarbon residue or $R_1$ and $R_2$ together represent a member selected from the group consisting of divalent aliphatic, cycloaliphatic and araliphatic hydrocarbon residue.

2. A composition as claimed in claim 1, which contains 4-aminopyridine as accelerator (c).

3. A composition as claimed in claim 1, which contains 3-aminopyridine as accelerator (c).

4. A composition as claimed in claim 1, which contains 4-anilinopyridine as accelerator (c).

5. A composition as claimed in claim 1, which contains 0.05 to 0.5 part by weight of the monoaminopyridine (c) for every 100 parts by weight of the polyepoxide (a).

6. A composition as claimed in claim 1, which contains about 0.2 part by weight of the monoaminopyridine (c) for every 100 parts by weight of the polyepoxide (a).

7. A composition as claimed in claim 1, which contains a polyglycidyl ether of a polyhydric phenol as polyepoxide (a).

8. A composition as claimed in claim 7, which contains a polyglycidyl ether of 2,2-bis(p-hydroxyphenyl)propane as polyepoxide.

9. A composition as claimed in claim 7, which contains a polyglycidyl ether of a phenol-novolak or a polyglycidyl ether of a cresol-novolak as polyepoxide.

References Cited

UNITED STATES PATENTS 2,717,885   9/1955   Greenlee.
2,847,395   8/1958   Wear.

HAROLD D. ANDERSON, Primary Examiner
THEODORE E. PERTILLA, Assistant Examiner

U.S. Cl. X.R.

117—127, 161; 260—2, 13, 28, 29.1, 37, 59